United States Patent Office 3,502,702
Patented Mar. 24, 1970

---

3,502,702
PLICATENOL PRODUCT AND PROCESS
John Howard, Vancouver, British Columbia, Canada (% ITT Rayonier, Inc., Olympic Research Division, Shelton, Wash. 98584)
No Drawing. Filed May 27, 1968, Ser. No. 732,053
Int. Cl. C07c *39/12, 37/00*
U.S. Cl. 260—613                      5 Claims

ABSTRACT OF THE DISCLOSURE

A new composition of matter comprising 1-(3',4'-dihydroxy-5'-methoxyphenyl)-2,7-dihydroxy - 3 - methyl-6-methoxynapthalene ("plicatenol") having utility as an anti-oxidant for fats and oils is disclosed. This compound is prepared by heating plicatin (a derivative of plicatic acid) to a temperature of about 200° C. in the absence of air for a sufficient period of time to produce a pyrolysis reaction product comprising plicatenol.

BACKGROUND OF THE INVENTION

Plicatic acid has the following structure as shown by its chemical degradation products, nuclear magnetic resonance spectra and X-ray crystallography in investigations by Gardner, Barton and MacClean, Can. J. Chem. 37, 1703–9 (1959); Gardner, MacDonald and MacLean, Can. J. Chem. 38, 2387–94 (1960) and Gardner, Swan, Sutherland and MacLean Can. J. Chem. 44, 52–8 (1966).

(I)
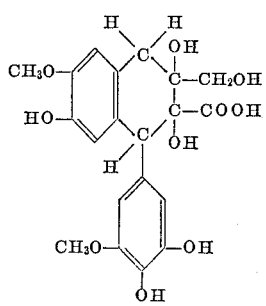

A process for the preparation and recovery of pure amorphous plicatic acid from the aqueous extract of western red cedar is described in U.S. patent application of Langille and Gray, Ser. No. 386,429, filed July 30, 1964 and now abandoned, and a process for preparing pure crystalline plicatic acid tetrahydrate is described in U.S. patent application of Howard and McIntosh, Ser. No. 687,092, filed Dec. 1, 1967.

Plicatin may be prepared by heating pure amorphous plicatic acid at a temperature of 130° C. to 150° C. or pure crystalline plicatic acid tetrahydrate at a temperature of about 180° C. in the substantial absence of oxygen for a sufficient length of time to drive off the water of crystallization (in the case of the tetrahydrate) and one molecule of water from the adjoining carboxylic acid and hydroxymethyl radicals of the plicatic acid molecule. Plicatin has the following structure as shown by its chemical degradation products, N.M.R. spectra, and X-ray crystallography data:

(II)
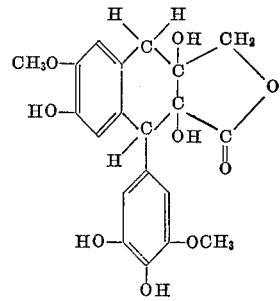

SUMMARY OF THE INVENTION

I have discovered that a new composition of matter, hereinafter referred to as plicatenol, is produced by the pyrolysis of plicatin. Specifically, I have found that when plicatin, advantageously obtained by heating plicatic acid in the manner herein described, is itself heated at a temperature of about 200° C. in the substantial absence of oxygen for a prolonged period of time a pyrolysis reaction product is obtained that comprises predominantly the new composition of matter plicatinol together with a minor amount of another compound, hereinafter referred to as "dianhydroplicatin." The material is useful as an anti-oxidant for fats and oils. Its usefulness as a metal chelating agent is also indicated.

Plicatenol has been found to be 1-(3',4'dihydroxy-5'-methoxyphenyl)-2,7-dihydroxy - 3 - methyl-6-methoxynapthalene and to have utility as an anti-oxidant for fats and oils. It has the following structural formula:

(III)
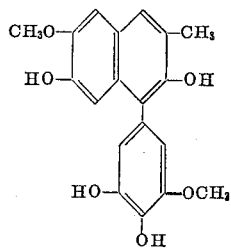

Dianhydroplicatin has been found to be 1-(3',4'-dihydroxy - 5 - methoxyphenyl)-3-hydroxymethyl-6-methoxy-7 - hydroxynaphthalene - 2 - carboxylic acid gamma-lactone and to have the following structural formula:

(IV)
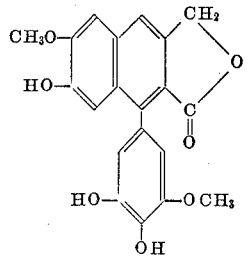

Acetylation of the plicatin pyrolysis reaction product in the manner hereinafter described results in the formation of the tetra-acetate of plicatenol and the tri-acetate of dianhydroplicatin which may readily be separated and recovered as two new compositions of matter. These two new compositions of matter have the following structural Formulae V and VI respectively:

(V)

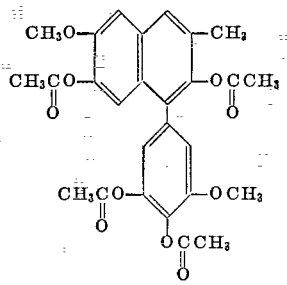

(VI)

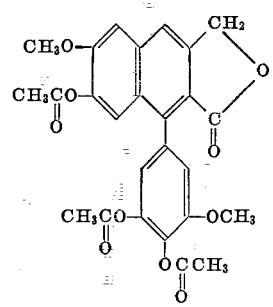

DETAILED DESCRIPTION

As previously pointed out, pure amorphous plicatic acid can be recovered from the aqueous extract of western red cedar wood by the process described in U.S. patent application of Langille and Gray, Ser. No. 386,429, and pure crystalline plicatic acid tetrahydrate can be recovered from this aqueous extract by the process described in U.S. patent application of Howard and McIntosh, Ser. No. 687,092.

Plicatic acid is converted to the lactone of this acid by the removal of one molecule of water from the adjoining carboxylic acid and hydroxymethyl radicals of the plicatic acid molecule. The removal of this molecule of water can be accomplished either chemically or thermally. For example, the reaction between plicatic acid tetrahydrate and N,N' - dicyclohexylcarbodiimide in an ethyl acetate solution produces N,N'-dicyclohexyl urea and plicatin which are then separated and recovered. Alternatively, when pure amorphous plicatic acid is heated to a temperature of above about 130° C. in the substantial absence of oxygen, the plicatic acid molecule lactonizes quantitatively in the manner described to form pure plicatin. Similarly, when pure crystalline plicatic acid tetrahydrate is heated in the substantial absence of oxygen, four molecules of water (i.e., the water of hydration) are driven off at a temperature of about 92–94° C. to form anhydrous crystalline plicatic acid. Continued heating of the anhydrous crystalline pricatic acid results in no change until the melting point of about 176° C. is reached. At or slightly above the melting point the crystalline plicatic acid lactonizes with the evolution of one molecule of water to form plicatin. The plicatin product obtained by the pyrolysis of anhydrous plicatic acid and crystalline plicatic acid tetrahydrate is a pure, amorphous substance.

I have now found that when plicatin is heated at a temperature of at least about 195° C., and preferably from about 200° to 205° C., in the substantial absence of oxygen, and preferably in a vacuum, a chemical reaction occurs in which one molecule of water and one molecule of carbon dioxide are removed from the plicatin molecule to form a new compound herein referred to as plicatenol. At the same time a relatively small amount of a gamma-lactone, herein referred to as dianhydroplicatin, is formed. The plicatin should be maintained at the pyrolysis reaction temperature for a sufficient length of time to insure substantially complete conversion of the plicatin to the aforementioned pyrolysis reaction products. Usually, a minimum of about three hours is required to accomplish this result. The two products of the pyrolysis reaction may be separated by conventional recrystallization techniques. For example, the reaction product can be dissolved in methanol, the resultant solution clarified with decolorizing charcoal, the decolorized methanolic solution filtered and then treated with water to precipitate crystals of plicatenol monohydrate therefrom. Alternatively, the two reaction products can be separated by chemical means. For example, the reaction product can be acetylated to convert the plicatenol to the corresponding tetra-acetate and the dianhydroplicatin to the corresponding tri-acetate which are then readily separated by conventional recrystallization techniques.

The following examples are illustrative but not limitative of the practice of our invention.

EXAMPLE I

This example illustrates the preparation of plicatenol by the pyrolysis of pure anhydrous plicatic acid.

Forty grams (40 g.) of crystalline plicatic acid tetrahydrate (81 mM.) was dissolved in 100 ml. of hot water in a tared flask and the water rapidly removed under slight vacuum at 80° C. so as to prevent any recrystallization of the acid. The residue of glass-like non-crystalline plicatic acid was then heated under high vaccum (<0.1 mm. Hg) to 200° C. in an oil bath. After 1½ hours the weight loss and thin layer chromatography (silica gel plate, benzene: ethanol: glacial acetic acid 100:20:1 by volume as solvent, iodine vapor as detecting reagent) indicated that all the plicatic acid had been converted into plicatin (Rf 0.2). Heating at 200° C. under high vacuum for another 6 hours caused further weight loss and converted the plicatin entirely into plicatenol and a small amount of dianhydroplicatin (Rf 0.34 and 0.3, respectively, using the same chromatographic system as mentioned above). The minor dianhydroplicatin spot was found to be fluorescent when exposed to ultra violet light. The dark reaction mixture was then purified by dissolution in methanol (15 parts by volume), treatment with a little decolorizing charcoal, filtration, and addition of water (45 parts by volume). The clear, almost colorless solution soon started to deposit colorless crystalline plicatenol monohydrate and crystallization was completed by cooling to +5° C. to give a 50% weight yield based on original plicatic acid, (this represents a 60% theoretical yield). The material still contained a trace of dianhydroplicatin. It melted at 122–5° C. with loss of the hydrated molecule of water and then crystallized again in the anhydrous form; the latter finally melted at 220–2° C. (Leitz hot stage equipment). The material had no detectable optical rotation in ethyl acetate solution using sodium light. It analyzed as follows: 64.54% carbon, 5.53% hydrogen and 4.8% water. Pure plicatenol monohydrate $C_{19}H_{18}O_6 \cdot H_2O$ requires: 63.33% carbon, 5.53% hydrogen and 5.0% water. The nuclear magnetic resonance spectrum in deuteroacetone at 60 M./c. and the infrared spectrum in mineral oil were consistent with the structure given for plicatenol above.

EXAMPLE II

This example illustrates the formation of plicatenol by the pyrolysis of pure crystalline plicatic acid tetrahydrate.

Nine and eighty-eight hundredths of a gram of crystalline plicatic acid tetrahydrate (9.88 g., 20 mM.) was heated to 200–205° C. in an evacuated flask connected to a flask containing 0.1 N sodium hydroxide held at room temperature. After 22 hours the original plicatic acid had lost a total of 2.40 g. of which 0.765 g. (17.4 mM.) was found to be carbon dioxide by back titration of the sodium hydroxide with 0.1 N hydrochloric acid.

Thin layer chromatography showed that all the plicatic acid had been converted into plicatenol and a trace of dianhydroplicatin. Crystallization from methanol-water as in Example I gave almost pure product, but still containing a little dianhydroplicatin impurity.

EXAMPLE III

This example illustrates the acetylation of the pyrolysis reaction product of amorphous plicatic acid to form the tetra-acetate of plicatenol and the tri-acetate of dianhydroplicatin.

Five grams (5. g.) of crude pyrolysis product as produced in Example I was dissolved in 40 ml. of dry pyridine contained in an Erlenmeyer flask fitted with a serum cap and magnetic stirrer. While cooling in an ice-bath, 8 ml. of acetic anhydride was added via a hypodermic syringe over a five minute period to the stirred mixture. The reaction was then allowed to proceed overnight at room temperature after which time 125 ml. of chloroform was added. The resulting solution was washed successively using two portions of 200 ml. of 1.5 N hydrochloric acid, 30 ml. of 5% sodium acetate and finally 50 ml. of water. The chloroform phase was then dried over anhydrous magnesium sulfate, and after filtering the solvent was removed to leave a dark syrup. This was purified by column chromatography using 50 g. of silica gel and chloroform as the eluting solvent. Colored impurities remained at the top of the column while two separate components were eluted from the column into a fraction collector.

The first and major product (plicatenol tetra-acetate, 2.3 g.) crystallized upon removal of the chloroform and trituration with ether. After two recrystallizations from ethyl acetate-petroleum ether, it melted at 188–90° C. and was found to be homogeneous by thin layer chromatography. It was optically inactive in chloroform, and its infrared spectrum in mineral oil and nuclear magnetic resonance spectrum in deuterochloroform at 60 M./c. were consistent with the structure given for plicatenol with all four phenolic hydroxyl acetylated. Empirical analysis also supports this structure. Thus, plicatenol tetra-acetate $C_{27}H_{26}O_{10}$ requires 63.52% carbon, 5.13% hydrogen and 33.6% acetyl. Found 63.48% carbon, 5.02% hydrogen and 31.7% acetyl.

The second and minor fraction to be eluted from the column also crystallized after removal of the chloroform and trituration of the residual syrup with ether. Recrystallization from ethyl acetate—petroleum ether yielded 0.3 g. of dianhydroplicatin tri-acetate M.P. 213–5° C. This material was homogeneous by thin layer chromatography. Its infrared spectrum in mineral oil and its nuclear magnetic spectrum in deuterochloroform at 60 M./c. were consistent with the structure given to dianhydroplicatin with all three phenolic hydroxyl groups acetylated. Dianhydroplicatin tri-acetate, $C_{26}H_{22}O_{10}$ requires: 63.15% carbon, 4.48% hydrogen. Found: 52.7% carbon, 4.46% hydrogen.

EXAMPLE IV

This example illustrates the excellent anti-oxidant effectiveness of plicatenol as shown by standard tests of this property.

The anti-oxidant activity of plicatenol was evaluated by the standard A.O.C.S. method in which the relative worth of a particular compound as an anti-oxidant is determined by the number of hours it takes for a sample of a given fat or oil containing 0.01% by weight of the compound to develop a peroxide value of 100 me. per 1,000 grams of the oil or fat. This value of 100 is referred to as the standard of rancidity. The following table sets forth the relative effectiveness of plicatenol, as compared with the pure substrate, as an anti-oxidant for lard and safflower oil, based on the aforementioned standards of rancidity for these substrates.

Relative Anti-oxidant Effectiveness
[Standard A.O.C.S. Method]

| Compound | Time in Hours to Standard Rancidity Value | |
|---|---|---|
| | Safflower Oil | Lard |
| Plicatenol | 11.6 | 40.5 |
| Control (pure substrate) | 6.75 | 9.0 |

I claim:
1. Plicatenol, a compound having the structral formula:

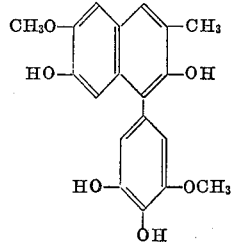

2. The composition of claim 1 in admixture with a minor amount of dianhydroplicatin.

3. The process for producing plicatenol which comprises heating the lactone of plicatic acid at a temperature of about 200° C. in the substantial absence of oxygen for a sufficient length of time to effect substantially complete conversion of said lactone to the pyrolysis reaction product comprising predominantly plicatenol, in admixture with a minor amount of dianhydroplicatin, and separating and recovering said plicatenol and dianhydroplicatin as separate products.

4. The process of claim 3 wherein heating is carried out for a period of at least three hours.

5. The process of claim 3 in which the plicatenol and dianhydroplicatin are separated by reacting the pyrolysis reaction product with acetic anhydride to convert the plicatenol to plicatenol tetra-acetate and the dianhydroplicatin to dianhydroplicatin tri-acetate, followed by separation of said tetra-acetate from said tri-acetate by recrystallization in a solvent therefor.

References Cited

Elsevier's Encyclopedia of Organic Chemistry, Series III, vol. 12B (1950) pp. 2169–2171.

BERNARD HELFIN, Primary Examiner

U.S. Cl. X.R.

260—343.6, 398.5, 479

PO-1050
(5/69)

UNITED STATES PATENT OFFICE
CERTIFICATE OF CORRECTION

Patent No. 3,502,702        Dated March 24, 1970

Inventor(s) JOHN HOWARD

It is certified that error appears in the above-identified patent and that said Letters Patent are hereby corrected as shown below:

Column 3, line 48, "purse" should read -- pure --

Column 3, line 57, "pricatic" should read -- plicatic --

Column 5, line 56, "52.7% carbon should read -- 62.7% carbon --

SIGNED AND
SEALED
AUG 11 1970

(SEAL)
Attest:

Edward M. Fletcher, Jr.
Attesting Officer

WILLIAM E. SCHUYLER, JR.
Commissioner of Patents